United States Patent
Bösche et al.

(10) Patent No.: US 9,102,364 B2
(45) Date of Patent: Aug. 11, 2015

(54) CROSS MEMBER ASSEMBLY, IN PARTICULAR A FLOOR CROSS MEMBER AND/OR A FOOTWELL CROSS MEMBER ASSEMBLY, ON A VEHICLE BODY, IN PARTICULAR ON A MOTOR VEHICLE BODY

(75) Inventors: Thorben Bösche, Wolfsburg (DE); Stefan Thiele, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 27 days.

(21) Appl. No.: 13/884,579

(22) PCT Filed: Oct. 21, 2011

(86) PCT No.: PCT/EP2011/005305
§ 371 (c)(1),
(2), (4) Date: Jul. 3, 2013

(87) PCT Pub. No.: WO2012/062406
PCT Pub. Date: May 18, 2012

(65) Prior Publication Data
US 2013/0270871 A1 Oct. 17, 2013

(30) Foreign Application Priority Data
Nov. 9, 2010 (DE) .......................... 10 2010 050 824

(51) Int. Cl.
*B62D 25/20* (2006.01)
(52) U.S. Cl.
CPC ............ *B62D 25/20* (2013.01); *B62D 25/2018* (2013.01)
(58) Field of Classification Search
CPC .................................................... B62D 25/20
USPC ............ 296/204, 209, 187.1, 187.11, 187.12, 296/187.03, 193.07, 75, 205, 203.02
See application file for complete search history.

(56) References Cited

U.S. PATENT DOCUMENTS 5,335,080 A    8/1994   Park
7,188,893 B2 *   3/2007   Akasaka ...................... 296/204
(Continued)

FOREIGN PATENT DOCUMENTS

DE    42 27 668    2/1994
DE   100 23 112   11/2001
(Continued)

OTHER PUBLICATIONS

International Search Report and Written Opinion issued for PCT International Application No. PCT/EP2011/005305, dated Jan. 19, 2012.
(Continued)

*Primary Examiner* — Pinel Romain
(74) *Attorney, Agent, or Firm* — Pearl Cohen Zedek Latzer Baratz LLP

(57) ABSTRACT

The invention relates to a cross member assembly, in particular a floor cross member assembly and/or a footwell cross member assembly, on a vehicle body, having a cross member (4) which extends in the vehicle transverse direction and on which at least one longitudinal member (6), to which force may be applied, in particular in a crash situation, and which essentially extends in the vehicle longitudinal direction, is supported by force in a defined longitudinal member supporting area (13), the cross member assembly having at least one member component (9, 10, 11) which extends away from the cross member (4) diametrically opposed to the longitudinal member (6) to which force may be applied and/or which is connected in a member component connecting area. According to the invention, a defined, force-conducting load path profile (12), which is designed to be elevated and/or recessed in relation to an adjacent surface area of the cross member (4), is provided on the cross member (4) and extends from the longitudinal member supporting area (13) in the direction of or up to at least one member component (9, 10, 11) and forms a defined load path area on the cross member side.

20 Claims, 7 Drawing Sheets

(56) References Cited

U.S. PATENT DOCUMENTS

| | | |
|---|---|---|
| 2003/0137163 A1 | 7/2003 | Hayashi et al. |
| 2005/0140179 A1 | 6/2005 | Morsch et al. |
| 2006/0006699 A1* | 1/2006 | Matsuyama et al. ..... 296/203.02 |
| 2008/0238148 A1 | 10/2008 | Nakamura et al. |
| 2010/0072789 A1 | 3/2010 | Boettcher et al. |

FOREIGN PATENT DOCUMENTS

| | | |
|---|---|---|
| DE | 102 32 841 A1 | 2/2004 |
| DE | 10 2004 061 707 | 7/2006 |
| DE | 10 2005 031 728 | 7/2006 |
| DE | 10 2005 025 200 | 12/2006 |
| DE | 10 2005 025 202 | 12/2006 |
| DE | 10 2006 004 045 A1 | 8/2007 |
| DE | 10 2006 013 548 | 10/2007 |
| DE | 10 2006 036 902 | 2/2008 |
| EP | 1 277 648 | 1/2003 |
| EP | 1 437 291 B1 | 10/2006 |
| JP | 2003-246277 | 9/2003 |
| WO | WO 90/02680 | 3/1990 |

OTHER PUBLICATIONS

Search Report issued for German Patent Application No. 10 2010 050 824.1, dated Jul. 26, 2011.

* cited by examiner

US 9,102,364 B2

CROSS MEMBER ASSEMBLY, IN PARTICULAR A FLOOR CROSS MEMBER AND/OR A FOOTWELL CROSS MEMBER ASSEMBLY, ON A VEHICLE BODY, IN PARTICULAR ON A MOTOR VEHICLE BODY

CROSS-REFERNECE TO RELATED APPLICATIONS

This application is a National Phase Application of PCT International Application No. PCT/EP2011/005305, International Filing Date Oct. 21, 2011, which claims priority to German Patent Application No. 10 2010 050 824.1, filed Nov. 9, 2010, which is hereby incorporated by reference.

FIELD OF THE INVENTION

The present invention relates to a cross member assembly, in particular a floor cross member assembly and/or a footwell cross member assembly, on a vehicle body, in particular on a motor vehicle body, according to the definition of the species in claim 1.

BACKGROUND OF THE INVENTION

Cross member assemblies of this type in a vehicle or on a vehicle body are generally known, for example from DE 10 2006 004 045 A1, in which a longitudinal member is bifurcated in such a way that one of its bifurcated member arms is connectable to a footwell cross member. This footwell cross member is made of a double sheet metal part having an upper sheet metal part and a lower sheet metal part and is connected in its central area to the end side of a central tunnel via a connecting point. Based on the hollow profile design of the footwell cross member, due to the double sheet metal, impact forces acting upon the lower longitudinal member may be additionally conducted to the central tunnel in the rear area of the vehicle via the bifurcated member arm connected thereto and via the footwell cross member.

Furthermore, a floor member assembly in a motor vehicle is known from DE 102 32 841 A1, in which a front cross member extends transversely to the vehicle longitudinal axis between two side sills of the vehicle body and is fixedly connected thereto. Longitudinal members are situated between the two sills, these longitudinal members, in turn, extending from the vehicle front end to the back beneath a floor panel that seals the passenger cell from below. These longitudinal members butt against the end plate of the front cross member by a large profile cross section and are subsequently guided beneath the floor panel, offset in height by a comparatively smaller profile cross section, the front cross member being fixed by web plates to sills having cutouts. This is intended, on the one hand, to ensure a footwell which is protected against deformation and, on the other hand, to transfer occurring forces to components beneath the passenger cell in a defined manner via the longitudinal members and the front cross member.

A footwell cross member assembly is furthermore known from US 2008/0238148 A1, in which the footwell cross member essentially extends over the entire width of the vehicle and is connected between side sills. The force, in this case, is transferred, in particular, to the side sill area and from there to the rear passenger cell area.

A footwell cross member is also known from EP 1 437 291 B1, which is adjoined by a cross element, profiled in a stepped manner, in the direction of the front longitudinal members, the cross element engaging with corresponding recessed sections of the front longitudinal member by its stepped, chamfered edges and also connecting so-called front suspension element holders to each other. Together with the footwell cross member, the cross element forms a hollow profile-like cross section in partial areas. The pedestrian cross member has a smooth structure in relation to the passenger compartment or in relation to the member components adjacent thereto.

SUMMARY OF THE INVENTION

In contrast, the object of the present invention is to provide a cross member assembly, in particular a floor cross member assembly and/or a footwell cross member assembly, on a vehicle body, in particular on a motor vehicle body, with the aid of which an improved distribution of forces may be achieved in a head-on crash situation.

This object is achieved by the features of patent Claim 1. Advantageous refinements are the subject matter of the subclaims.

According to claim 1, a cross member assembly, in particular a floor cross member assembly and/or a footwell cross member assembly, is provided on a vehicle body, having a cross member which extends in the vehicle transverse direction, preferably over the entire width of the vehicle or body, on which at least one longitudinal member, to which force may be applied, in particular in a crash situation, and which essentially extends in the vehicle longitudinal direction, is supported by a force in a defined longitudinal member supporting area, at least one member component of the vehicle body also being provided, which extends away from the cross member opposite the longitudinal member to which force may be applied and/or which is connected in a member component connecting area. According to the present invention, a defined, force-conducting load path profile, which is designed to be elevated and/or recessed, i.e., have an elevation or a recess, in relation to an adjacent surface area of the cross member, is provided on the cross member and extends from the longitudinal member supporting area in the direction of or up to at least one member component and thus forms a defined load path area on the cross member side.

With the aid of such a defined and targeted load path profile design on the cross member side, a higher longitudinal member force level may be particularly advantageously supported, maintaining the same or even a lower weight of the cross member, which is designed, in particular, as a footwell cross member. Modern crash requirements, which necessitate a high longitudinal member force level and also require a structurally higher front longitudinal member in the direction of the vehicle vertical axis, may thereby be easily satisfied without additional complexity, while retaining a conventional body structure in the cross member area.

A targeted or defined force-conducting load path design of this type thus makes it possible to achieve a targeted, homogeneous load distribution in the event of a crash.

Another important advantage of an elevated or recessed force-conducting load path profile of this type is that, in an advantageous dual function, this load path profile may simultaneously form a stiffening element, which additionally stiffens the cross member, and which additionally reduces, for example, the risk of a footwell intrusion in the event of a crash.

A load path profile of this type may furthermore be advantageously integrated directly into the cross member, in particular in the event that, in one particularly preferred embodiment, the load path profile is designed to be integral with the cross member, for example by beadlike profiling or shaping of a defined cross member area, which allows the component complexity to be advantageously reduced.

According to one particularly preferred, specific embodiment, it is provided that the load path profile is additionally formed on the cross member by a multi-part, in particular two-part or two-shell, hollow profile area, which results in a particularly advantageous stiffness of the load path profile area.

According to one particularly preferred specific embodiment, it is provided that the first profile section of the load path profile on the cross member extends essentially in the transverse direction of the vehicle along a defined route, the load path profile furthermore having at least one additional defined profile section which starts at the first profile section and is oriented in the direction of at least one member component. A load path profile geometry of this type provides a particularly advantageous force guidance and force distribution from the longitudinal member supporting area in the direction of the particular member components, via which the force may be diverted in a defined and targeted manner.

In this context, one specific embodiment is particularly preferred in which a load profile extends along a defined route in the area on each side of a central tunnel, in particular in the footwell area on the driver and passenger sides, viewed in the vehicle transverse direction. In this case, a targeted stiffening and/or force distribution or force application to the member components which are connected to or extend from the cross member is/are possible on each side of the central tunnel.

In this case, one specific embodiment is furthermore particularly preferred in which the load path profile has a U shape or a forked shape oriented in the direction of multiple member components, including a base which runs in the vehicle transverse direction, as the first profile section, from which legs or fork arms spaced a distance apart branch and/or bend off as additional profile sections in the direction of the particular assigned member components. A U-shaped or forked profiling of this type may be manufactured particularly easily and advantageously and permits a flowing, homogeneous force distribution of the forces applied to the cross member via the longitudinal member supporting area.

One embodiment is furthermore particularly preferred in which the load path profile, in particular the load path profile formed by a hollow profile on the cross member side, is situated above another hollow profile on the cross member side, viewed in the direction of the vehicle vertical axis, and/or merges with a cross member-side hollow profile situated thereunder. A structure of this type makes it possible to achieve a particularly stiff floor or footwell cross member structure.

The cross member preferably has an upper cross member section extending approximately in the direction of the vehicle vertical axis, on which the longitudinal member is supported, preferably supported over a planar area. In addition, the cross member in this case preferably has a diametrically opposed, lower cross member section to which at least one member component is connected. A structure of this type, in particular, results in an advantageous force deflection of the relatively high forces applied via the one or more longitudinal member(s) in relation to the direction of the vehicle vertical axis over the body floor area, in which multiple stable member components are regularly situated which may be advantageously used for force deflection, for example the side sills and/or the longitudinal member extensions and/or a reinforcement on the central tunnel side.

According to one preferred embodiment for an advantageous, fanned force deflection, it is provided that multiple member components situated a distance apart in the vehicle transverse direction are connected to the cross member or extend therefrom in such a way that the load path profile fans out and/or branches in a forked manner from the longitudinal member supporting area to at least one portion of the multiple member components. In this case, one specific embodiment is particularly preferred, in which the load path profile on the cross member side branches from the longitudinal member supporting area outward to the side and downward in the direction of a side sill as well additionally essentially downward in the direction of a longitudinal member extension and/or to a reinforcing member on the central tunnel side.

As discussed above, it is furthermore particularly advantageous that a longitudinal member, in particular a front longitudinal member in relation to the vehicle longitudinal direction, is connected to the cross member in each of assigned longitudinal member supporting areas on diametrically opposed sides of the vehicle in the vehicle transverse direction, viewed in relation to the central tunnel, a load path profile being assigned to each longitudinal member in such a way that a defined force deflection on both sides is possible in the direction of the member components extending from the cross member.

The cross member itself may, in principle, be designed in multiple parts, which, however, requires substantial structural complexity, possibly associated with a relatively heavy weight. According to one particularly preferred embodiment according to the present invention, it is therefore provided that the cross member is designed in two parts and includes a first shell part, in particular a first sheet metal shell part which is connected to a second shell part, in particular a second sheet metal shell part, in a planar contact connection which overlaps at least in some areas, in particular forming at least one defined, hollow profile area on the cross member side, for example to form the defined load path profile.

In this context, one specific embodiment is particularly advantageous, in which the longitudinal member on which the first shell part forming the longitudinal member supporting area is supported, while the second shell part is connected to the first shell part and designed in such a way that a hollow profile which is easy to manufacture is provided in the area of the load path profile.

According to another particularly preferred embodiment, it is furthermore provided that the first lower shell part in the mounted state has an essentially L-shaped cross section in the area to the left and right of a central tunnel and/or in the cross member on the load path profile side, on which the upper, second shell part having a stepped and/or an S-shaped cross section is placed in such a way that the two components adjoin each other in a planar contact connection at least in some areas in the area of the vertical L-shaped leg of the lower shell, the load path profile being formed in this contact area. The section of the second, upper shell part, which also forms the load path profile area and/or which adjoins the load path profile area downwardly in the direction of the vehicle vertical axis, is angled in the direction away from the first shell part and is directly or indirectly supported on and/or connected to the horizontal, lower L-shaped leg of the first shell part, viewed in the direction of the vehicle vertical axis, in such a way that a hollow profile area is provided in the area below the load path profile between the first shell part and the second shell part, which results in a particularly stiff and stable cross member design.

According to another particularly preferred embodiment, it is provided that the one-or multi-part, in particular two-part, cross member is formed from at least one hot-worked sheet metal component, in particular from at least one press-hardened, high-strength sheet metal component. According to one specific embodiment of this type, a significant stiffness may be achieved, in particular in the high-impact areas in the event of a crash, it being simultaneously possible to advantageously reduce the weight and part variety of the body structure, thus achieving favorable conditions overall, in particular with regard to $CO_2$ emissions and costs.

As member components, for example, a longitudinal member extension and/or a reinforcing member on the central tunnel side may be specifically connected to the cross member, essentially from below, as member components, viewed in the direction of the vehicle vertical axis. Alternatively or additionally, a side sill may be used as a member component, which is connected to the cross member in a side cross member area.

BRIEF DESCRIPTION OF THE DRAWINGS

The present invention is explained in detail on the basis of a drawing.

DETAILED DESCRIPTION OF THE INVENTION

Figure 1:
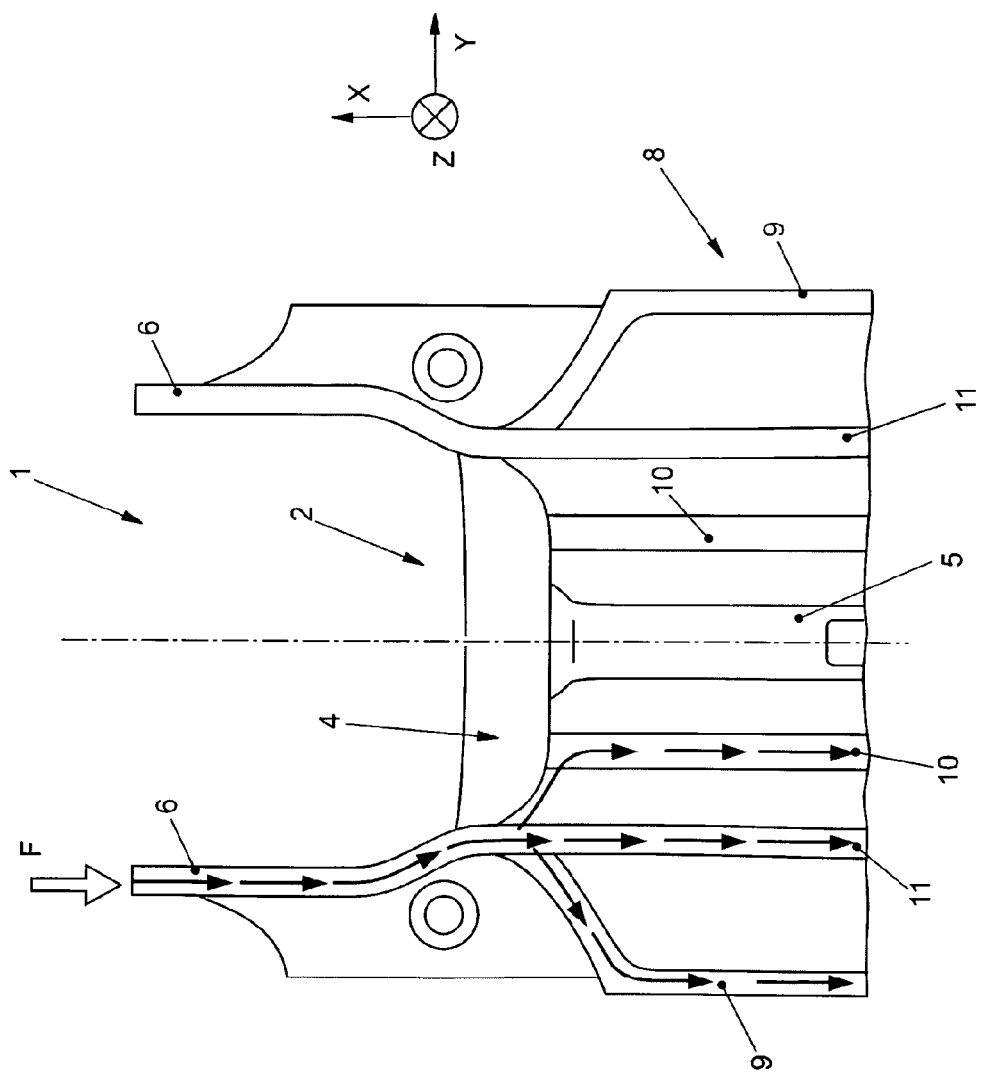
FIG. 1 shows a schematic and exemplary view from below of a vehicle body having a footwell cross member assembly according to the present invention, in a vehicle front end area.

FIG. 1 shows a schematic and exemplary view from below of a vehicle body 1 in the area of a cross member assembly 2 according to the present invention, which forms an end wall area of vehicle front end 3. In the area of floor or footwell cross member assembly 2 on the end wall side, which has a floor or footwell cross member 4 which is described in greater detail below, a front longitudinal member 6 is adjoined from the front on each side of a central tunnel 5, front longitudinal member 6 being supported on cross member 4 over a planar area, as is shown, in particular, in FIG. 2, via flange areas 7 which are illustrated only schematically herein.

Outer side sills 9 each adjoin cross member assembly 2 in the area of body area 9 [sic] on the passenger cell side, in relation to vehicle transverse direction y. In addition, a reinforcing member 10 which stiffens central tunnel 5 and which also adjoins cross member assembly 2 diametrically opposed to front longitudinal member 6 is provided on each side of central tunnel 5. Finally, a longitudinal member extension 11 extends from the cross member assembly to the back, viewed in vehicle longitudinal direction x, in the area between side sill 9 and tunnel-side reinforcing member 10.

Upon an impact on vehicle body 1 or if a force F is applied to front longitudinal member 6, a load path is provided via front longitudinal member 6 in conjunction with cross member assembly 2 and side sill 6, tunnel-side reinforcing member 10 and longitudinal member extension 11, with the aid of which the force applied via front longitudinal member 6 is distributed accordingly homogeneously to the three member components shown by way of example herein (sill 9, tunnel-side reinforcing member 10, longitudinal member extension 11).

In FIG. 1, this is shown only for the left-hand side on the image plane. It goes without saying that corresponding load distribution paths may result on the diametrically opposed right-hand side upon corresponding application of force.

Figure 2:
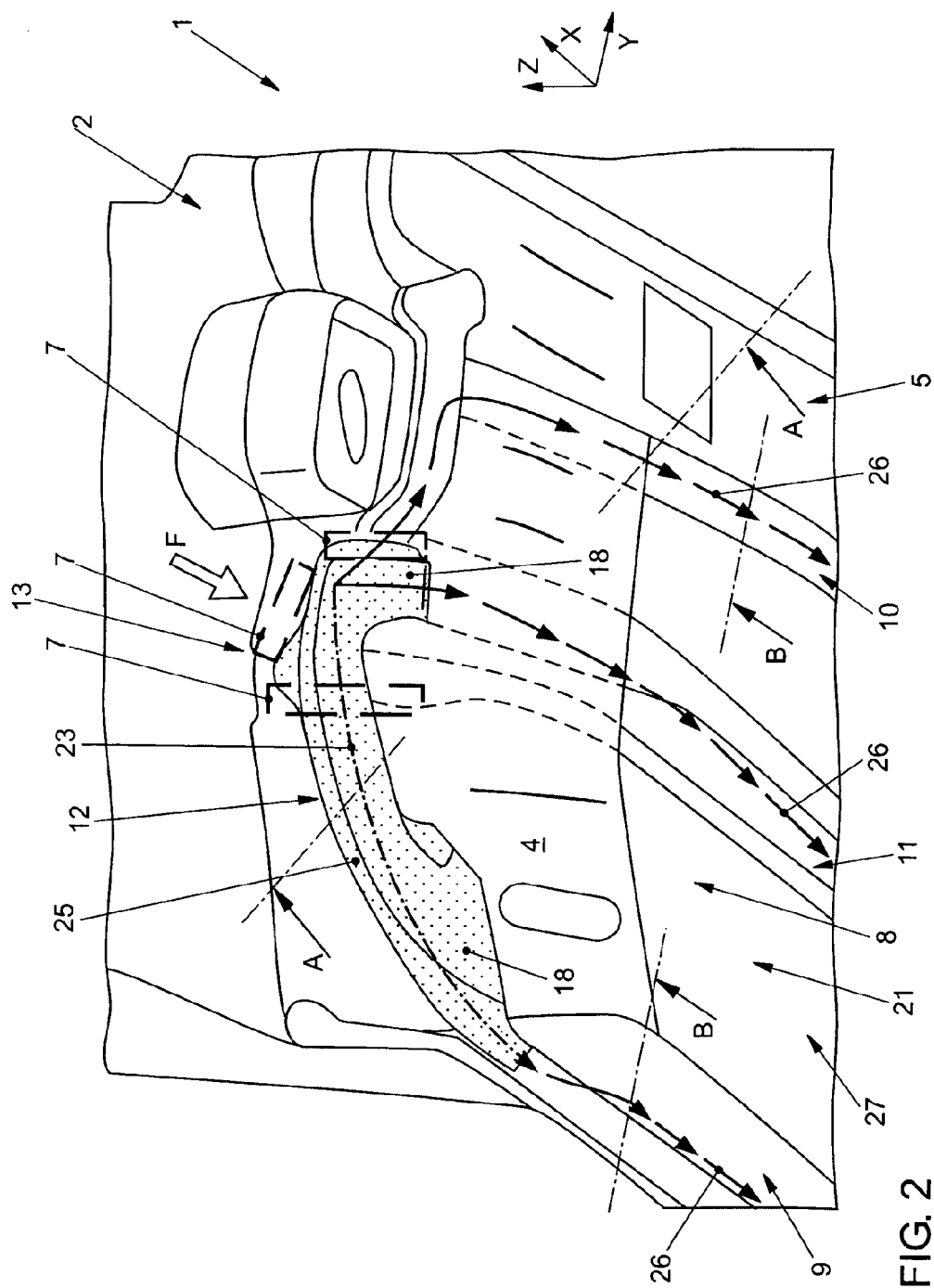
FIG. 2 shows a schematic, perspective diagram of a footwell area on the driver's side, including a cross member assembly according to the present invention.

To be able to achieve a particularly advantageous force distribution from front longitudinal member 6 to the member components selected by way of example herein (sill 9, longitudinal member extension 11 and tunnel-side reinforcing member 10), as is illustrated, in particular, in FIG. 2, a bead-like profiled, force-conducting load path profile 12 is integrated into cross member 4, which extends from longitudinal member supporting area 13, which is illustrated in FIG. 2 only extremely schematically by flange areas 7, in the direction of, in particular, sill 9 and longitudinal member extension 11, which is explained in greater detail below in conjunction with FIGS. 3 through 7.

Figure 3:
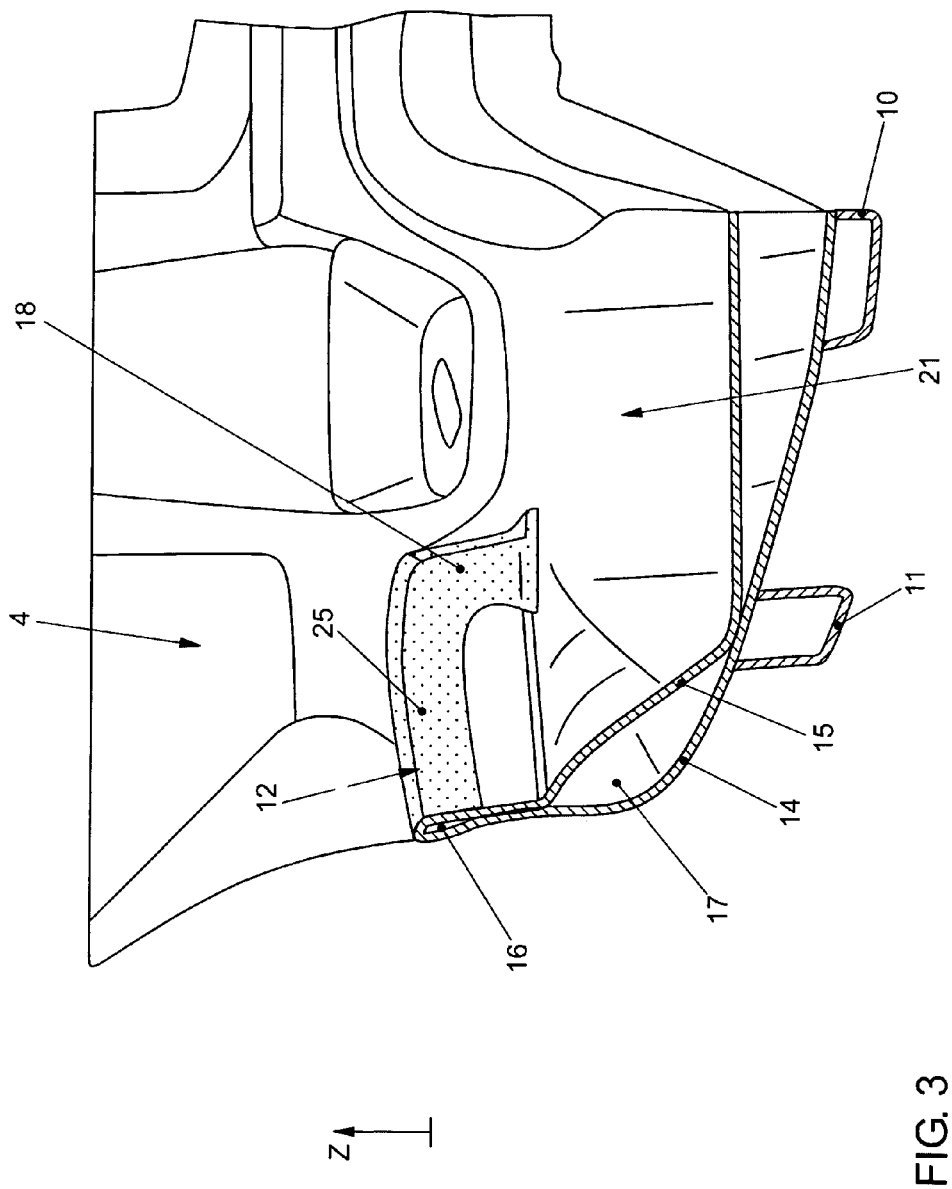
FIG. 3 shows a schematic sectional representation along line A-A of FIG. 2.

Specifically, cross member 4 has a two-shell design for this purpose, with a first upper sheet metal shell part which is connected to a second, lower sheet metal shell part 15 in a planar contact connection which overlaps at least in some areas, forming a hollow profile 16 in the area of load path profile 12 as well as another, underlying hollow profile area 17 in the direction of vehicle vertical axis z. Hollow profile 16 on the load path side may be situated above hollow profile area 17, spaced a distance apart at least in some areas, as is shown in FIG. 3, in particular, or it may at least partially merge with hollow profile area 17, in particular in leg-type profile section 18, which is described in greater detail below.

Figure 7:
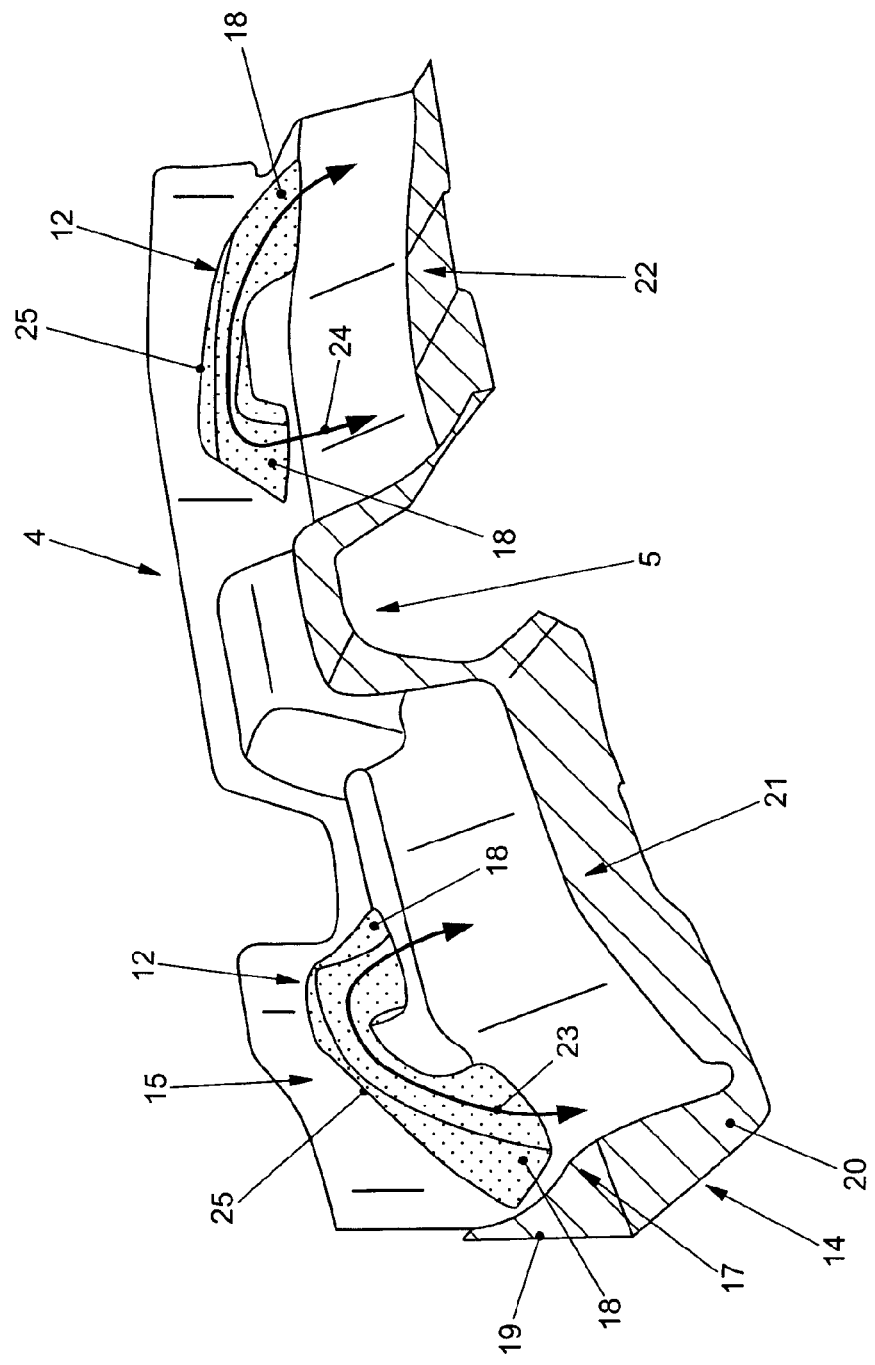
FIG. 7 shows a schematic view of a cross member according to the present invention in an isolated representation and having a two-shell design.

Specifically, first sheet metal shell part 14 is provided for this purpose with a stepped or S-shaped cross section, as is shown, in particular, in FIG. 7, which is placed on essentially L-shaped, lower, second sheet metal shell part 15 in such a way that these components adjoin each other in a planar contact connection at least in some areas in the area of vertical L-shaped leg 19, and load path profile 12 is provided therein in this contact area, while a section of upper, first shell part 14 which downwardly adjoins the load path profile area is angled in the direction away from lower, second sheet metal shell part 15 and is supported on and connected to horizontal lower L-shaped leg 20 of first sheet metal shell part 14, viewed in the direction of the vehicle vertical axis, in such a way that hollow profile area 17 described above is formed between the two sheet metal shell parts 14 and 15 in the area beneath load path profile 12.

The two sheet metal shell parts 14, 15 are preferably formed from a hot-worked sheet metal material, in particular from a press-hardened, high-strength sheet metal material, whereby these parts have a high stiffness and simultaneously a favorable weight.

The connection between the two sheet metal components may be established, for example in defined cross member areas, by welding, gluing, riveting or the like.

As shown, in particular, in FIG. 7, cross member 4, which extends between the two diametrically opposed, side, outer sills 9 in the mounted state in the vehicle transverse direction, has a load path profile 12, which has an essentially, in principle, identical structure or design on diametrically opposed vehicle sides or footwell areas 21, 22 in relation to central tunnel 5, with the aid of which the force transferred from front longitudinal member 6 to cross member 4 may be easily distributed or redirected in a targeted and defined manner to the desired member components (in this case, sill 9, longitudinal member extension 11 and tunnel-side reinforcing member 10), as is shown in only an extremely schematic manner by arrows 23 and 24 in FIG. 7 and which is explained in greater detail below, in particular on the basis of FIG. 2 and FIGS. 4 through 6.

As may be seen in FIGS. 2 through 7, load path profile 12 in this case has a first horizontal profile section 25, which extends essentially in vehicle transverse direction y in particular footwell area 21, 22 and which in this case forms a U base which is adjoined by a leg-type profile section 18 on each end, as was briefly described above in conjunction with FIG. 2.

These two leg-type, end-side profile sections 18 in this case are essentially oriented or bent in the direction of sill 9 or in the direction of longitudinal member extension 11, so that the force transferred to cross member 4 via front longitudinal member 6 (see force arrow 26 in FIGS. 2, 4, 5, and 6) may be accordingly deflected in a targeted manner in the direction of these member components.

Figure 4:
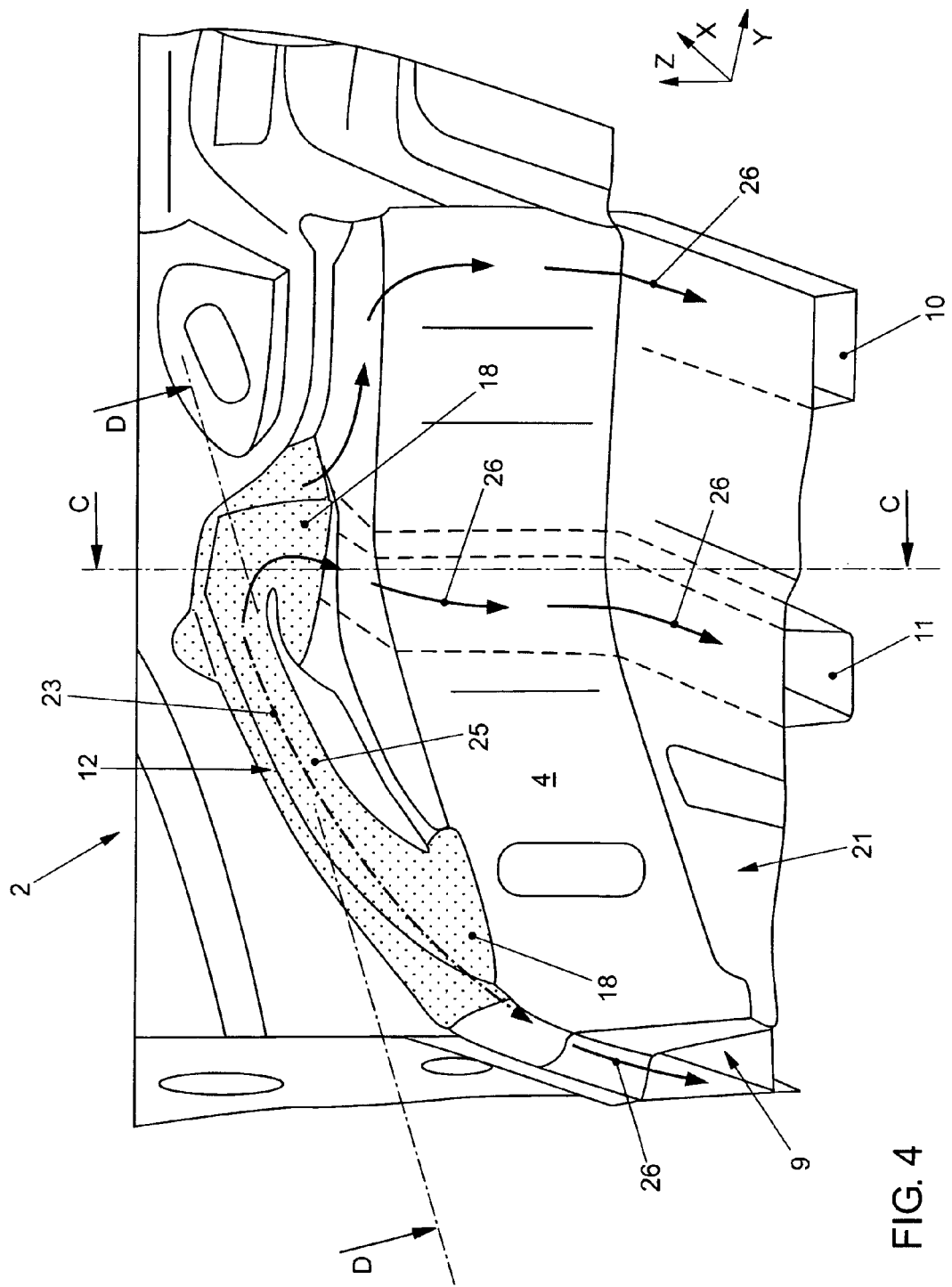
FIG. 4 shows a schematic sectional representation along line B-B of FIG. 2.
Figure 5:
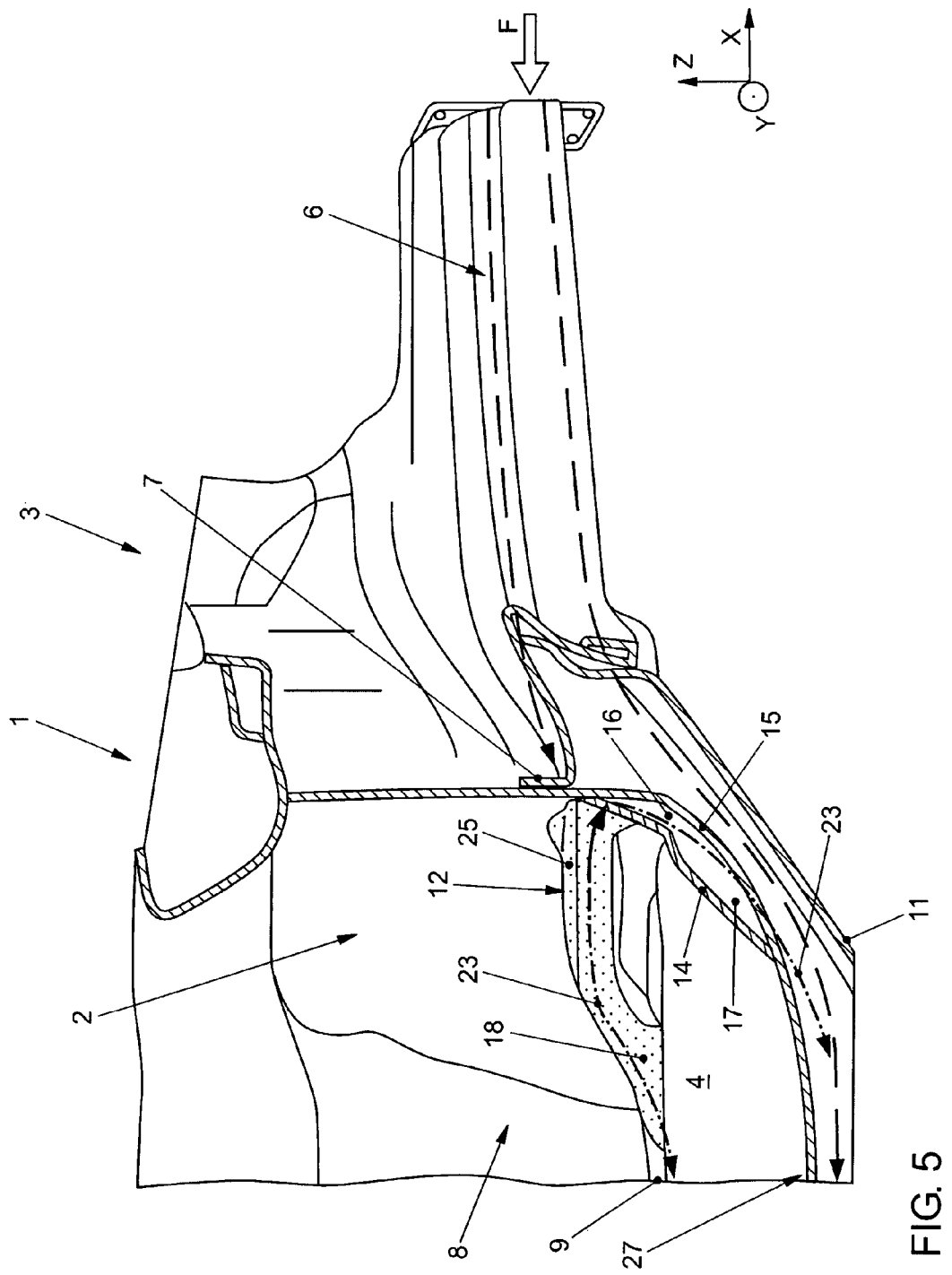
FIG. 5 shows a schematic sectional representation along line C-C of FIG. 4.
Figure 6:
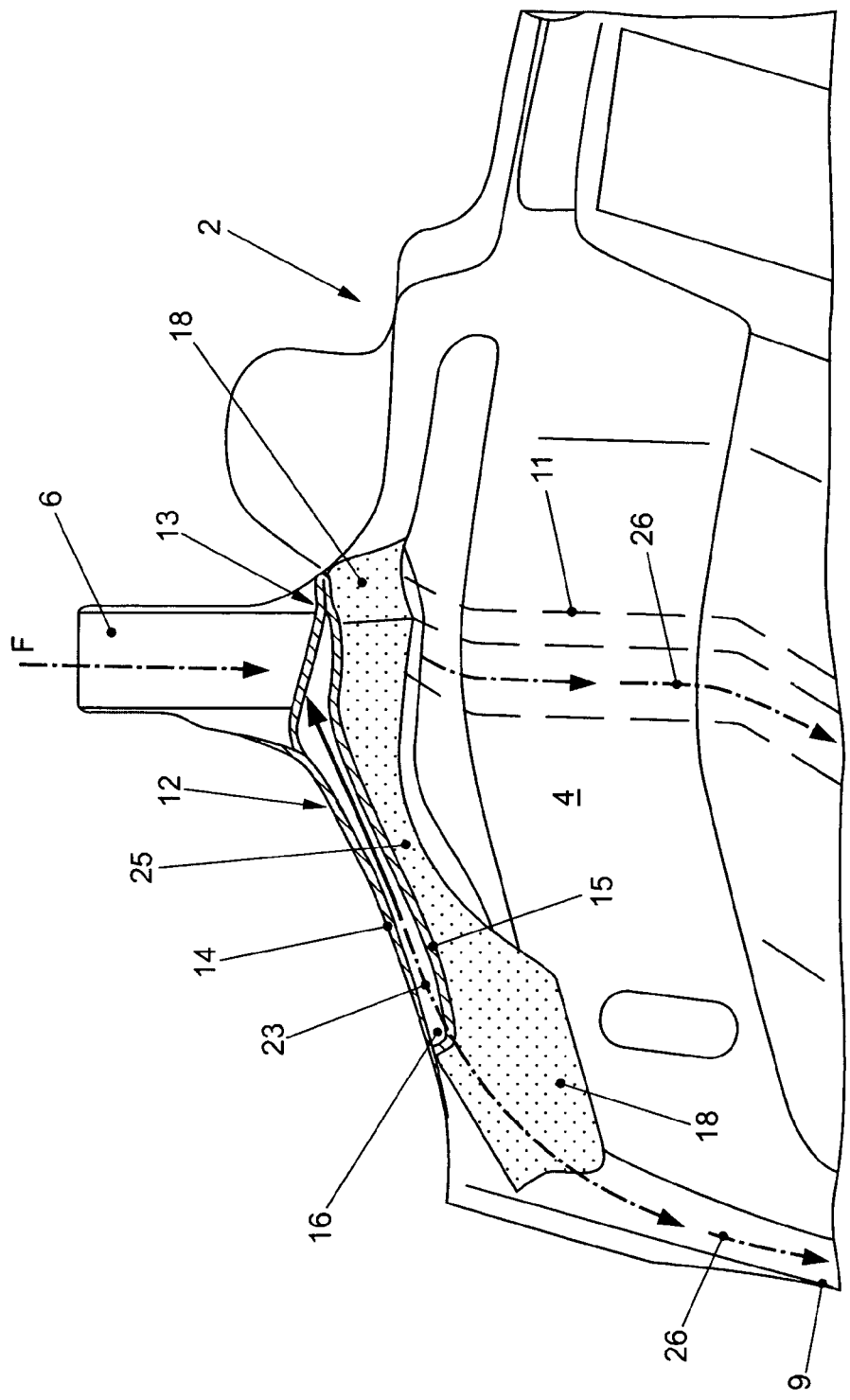
FIG. 6 shows a schematic sectional representation along line D-D of FIG. 4.

This force distribution is easy to see, in particular also in FIG. 5, which again clearly shows a cross-sectional view along line C-C of FIG. 4 of how transferred force F may be redirected and deflected to the individual load path sections in the floor area on the vehicle side via load path profile 12 according to the present invention, which merges with hollow profile area 17 on cross member 4. In particular, it is very easy to see from FIG. 5 the height at which front longitudinal member 6 is connected to cross member 4 above floor area 27 and supported by flange areas 7, viewed in the direction of vehicle vertical axis z.

It is understood that, for example, the member components (sill 9, longitudinal member extension 11, tunnel-side reinforcing member 10, to name only a few examples) may also be formed from a hot-worked sheet metal part in such a way that an altogether high-strength structure of vehicle body 1 results. The remaining design or paneling of the vehicle body, for example in floor area 27, may then be carried out, for example, using, in contrast, cold-worked sheet metal parts.

What is claimed is:

1. A cross member assembly, in particular a floor cross member assembly and/or a footwell cross member assembly on a vehicle body, said cross member assembly comprising:
   a cross member which extends in a vehicle transverse direction and on which at least one longitudinal member, to which force may be applied and which extends in a vehicle longitudinal direction, is supported by force in a defined longitudinal member supporting area; and
   at least one member component of the vehicle body which extends away from the cross member diametrically opposed to the at least one longitudinal member to which force may be applied and/or which is connected in a member component connecting area,
   wherein a defined, force-conducting load path profile, which is configured to be elevated and/or recessed in relation to an adjacent surface area of the cross member, is provided on the cross member and extends from the longitudinal member supporting area in a direction of or up to the at least one member component and forms a defined load path area on a cross member side.

2. The cross member assembly as recited in claim 1, wherein the defined, force-conducting load path profile is designed to be integral with the cross member and is formed by at least one beadlike profiling or shaping of a defined cross member area.

3. The cross member assembly as recited in claim 1, wherein the load path profile simultaneously forms a stiffening element which stiffens the cross member.

4. The cross member assembly as recited in claim 1, wherein the load path profile is provided on the cross member by a multi-part hollow profile area.

5. The cross member assembly as recited in claim 1, wherein multiple member components, which are spaced a distance apart in the vehicle transverse direction, are connected to the cross member in such a way that the load path profile fans out and/or branches in a forked manner from the longitudinal member supporting area to at least a portion of the multiple member components.

6. The cross member assembly as recited in claim 1, wherein
   a first profile section of the load path profile extends along a defined route on the cross member in the vehicle transverse direction, and
   the load path profile has at least one additional defined profile section which is oriented from the first profile section in the direction of at least one member component,
   wherein the load path profile has a U shape or fork shape which is oriented in the direction of multiple member components and which has a base running in the vehicle transverse direction as the first profile section, from which legs or fork arms, spaced a distance apart, branch in the direction of the particular assigned member components as additional profile sections.

7. The cross member assembly as recited in claim 5, wherein the defined, force-conducting load path profile on the cross member side extends from the longitudinal member supporting area outward to a side and downward in the direction of a side sill as well as downward in a direction of a longitudinal member extension and/or a reinforcing member on a central tunnel side.

8. The cross member assembly as recited in claim 1, wherein
   the cross member has an upper cross member section which extends in the direction of the vehicle vertical axis, on which the longitudinal member is supported, preferably supported in a planar contact connection, and
   the cross member has a diametrically opposed, lower cross member section, from which the at least one member component extends and/or to which the at least one member component is connected.

9. The cross member assembly as recited in claim 1, wherein a longitudinal member is connected to the cross member in the assigned longitudinal supporting area on diametrically opposed sides of the vehicle, viewed in the vehicle transverse direction in relation to a central tunnel, a load path profile being assigned to each longitudinal member in such a way that a defined transfer of force in the direction of the member components extending from the cross member is carried out with the aid of the two load path profiles,
   wherein a load path profile extends between a side sill area and the central tunnel area on both sides of a central tunnel, viewed in the vehicle transverse direction, as a load path profile on the footwell cross member side in the footwell area on the driver's and passenger's sides.

10. The cross member assembly as recited in claim 1, wherein the cross member is designed in two parts and includes a first shell part, in particular a first sheet metal shell part, which is connected to a second shell part, in particular a second sheet metal shell part, in planar contact connection which overlaps at least in some areas, forming at least one defined hollow profile area on the cross member side.

11. The cross member assembly as recited in claim 10, wherein the longitudinal member is supported on the first shell part forming the longitudinal member supporting area,
wherein the second shell is connected to the first shell part and designed in such a way that a hollow profile is formed in the area of the load path profile.

12. The cross member assembly as recited in claim 10, wherein,
in the mounted state, the first lower shell part has a largely L-shaped cross section in the area on the left and right of a central and/or in the cross member area on the load path profile side, viewed in the vehicle transverse direction, on which the upper, second shell part, which has a stepped and/or an S-shaped cross section, is placed in such a way that the two components adjoin each other in the area of the vertical L-shaped leg of the lower shell part in a planar contact connection at least in some areas, the load path being formed in this contact area, and
the section of the upper shell part, which also forms the load path profile area and/or which adjoins the load path profile area downwardly in the direction of the vehicle vertical axis, is angled in the direction away from the lower shell part and is directly or indirectly supported on and/or connected to the horizontal, lower L-shaped leg of the first shell part, viewed in the direction of the vehicle vertical axis, in such a way that a hollow profile area (17) is formed between the first shell part and the second shell part in the area beneath the load path profile.

13. The cross member assembly as recited in claim 1, wherein at least one contact flange on the longitudinal member side is provided for connecting the longitudinal member in the longitudinal member supporting area for support on the cross member over a planar area.

14. The cross member assembly as recited in claim 1, wherein the one- or multi-part cross member is formed from at least one hot-worked sheet metal component, in particular from at least one press-hardened, high-strength sheet metal component.

15. The cross member assembly as recited in claim 2, wherein the load path profile simultaneously forms a stiffening element which stiffens the cross member.

16. The cross member assembly as recited in claim 6, wherein the load path profile on the cross member side branches from the longitudinal member supporting area outward to the side and downward in the direction of a side sill as well as additionally downward in the direction of a longitudinal member extension and/or a reinforcing member on the central tunnel side.

17. The cross member assembly as recited in claim 11, wherein,
in the mounted state, the first lower shell part has a largely L-shaped cross section in the area on the left and right of a central tunnel and/or in the cross member area on the load path profile side, viewed in the vehicle transverse direction, on which the upper, second shell part, which has a stepped and/or an S-shaped cross section, is placed in such a way that the two components adjoin each other in the area of the vertical L-shaped leg of the lower shell part in a planar contact connection at least in some areas, the load path profile being formed in this contact area, and
the section of the upper shell part, which also forms the load path profile area and/or which adjoins the load path profile area downwardly in the direction of the vehicle vertical axis, is angled in the direction away from the lower shell part and is directly or indirectly supported on and/or connected to the horizontal, lower L-shaped leg of the first shell part, viewed in the direction of the vehicle vertical axis, in such a way that a hollow profile area is formed between the first shell part and the second shell part in the area beneath the load path profile.

18. The cross member assembly as recited in claim 5, wherein said multiple member components comprise at least one sill and at least one longitudinal member extension.

19. The cross member assembly as recited in claim 9, wherein the longitudinal member connected to the cross member in the assigned longitudinal supporting area on diametrically opposed sides of the vehicle is a front longitudinal member in relation to the vehicle longitudinal direction.

20. The cross member assembly as recited in claim 10, wherein the first shell part comprises a first sheet metal shell part, wherein the second shell part comprises a second sheet metal shell part.

* * * * *